H. J. McCLAIN.
ELECTRIC TOASTER.
APPLICATION FILED JULY 6, 1918.

1,330,642.

Patented Feb. 10, 1920.
2 SHEETS—SHEET 1.

WITNESSES

INVENTOR
H. J. McClain,
BY Victor J. Evans
ATTORNEY

H. J. McCLAIN.
ELECTRIC TOASTER.
APPLICATION FILED JULY 6, 1918.
1,330,642.
Patented Feb. 10, 1920.
2 SHEETS—SHEET 2.
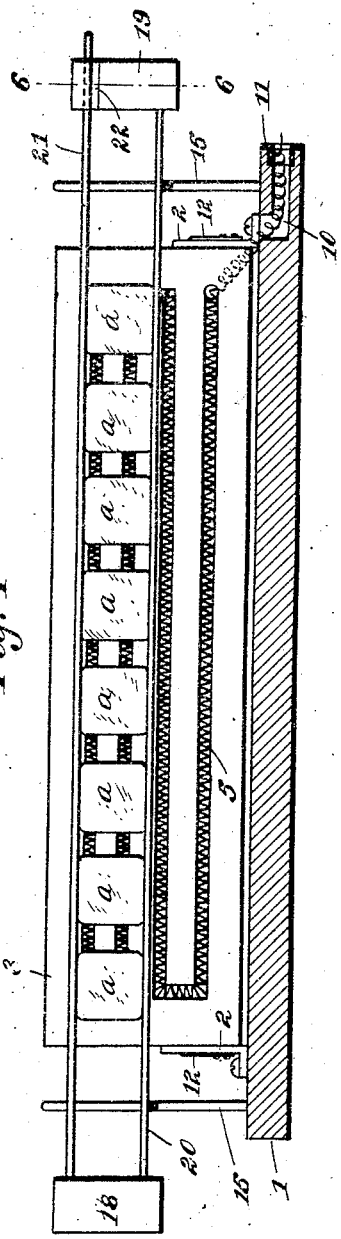
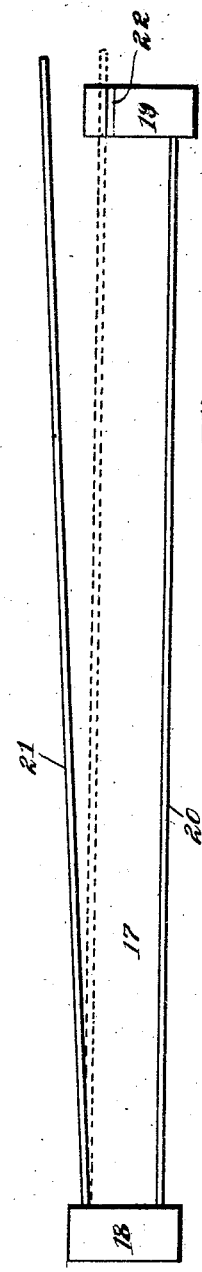
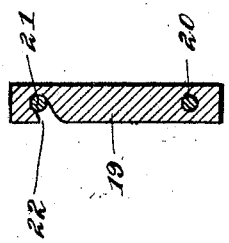
INVENTOR
H. J. McClain,
BY Victor J. Evans
ATTORNEY
WITNESSES

UNITED STATES PATENT OFFICE.

HUBERT J. McCLAIN, OF ROCKVILLE, INDIANA.

ELECTRIC TOASTER.

1,330,642.

Specification of Letters Patent.

Patented Feb. 10, 1920.

Application filed July 6, 1918. Serial No. 243,536.

*To all whom it may concern:*

Be it known that I, HUBERT J. MCCLAIN, a citizen of the United States, residing at Rockville, in the county of Parke and State of Indiana, have invented new and useful Improvements in Electric Toasters, of which the following is a specification.

This invention is an improved electric toaster for toasting bread, marshmallows and for other analogous purposes, the object of the invention being to provide an improved electric toaster of this kind which is simple in construction and which may be readily arranged either for toasting bread or the like or for toasting marshmallows.

The invention consists in the construction, combination and arrangement of devices hereinafter described and claimed.

In the accompanying drawings:—

Figure 1 is a plan of an electric toaster embodying my invention and arranged for use in toasting bread or the like.

Fig. 4 is a vertical longitudinal sectional view of the same when arranged for use for toasting marshmallows.

Fig. 5 is a detailed elevation of the marshmallow holder.

Fig. 6 is a detailed sectional view of the same on the plane indicated by the line 6—6 of Fig. 4.

Figure 1:
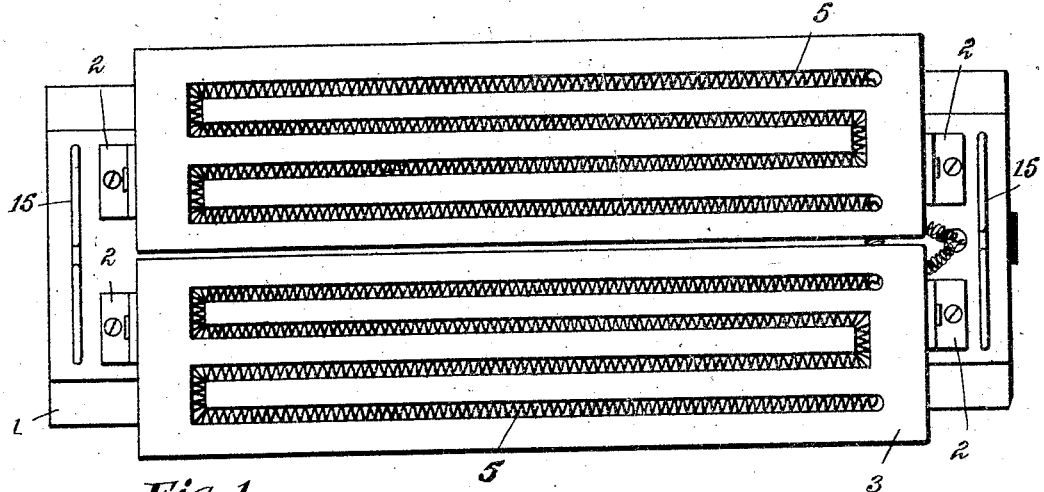
Figure 2:
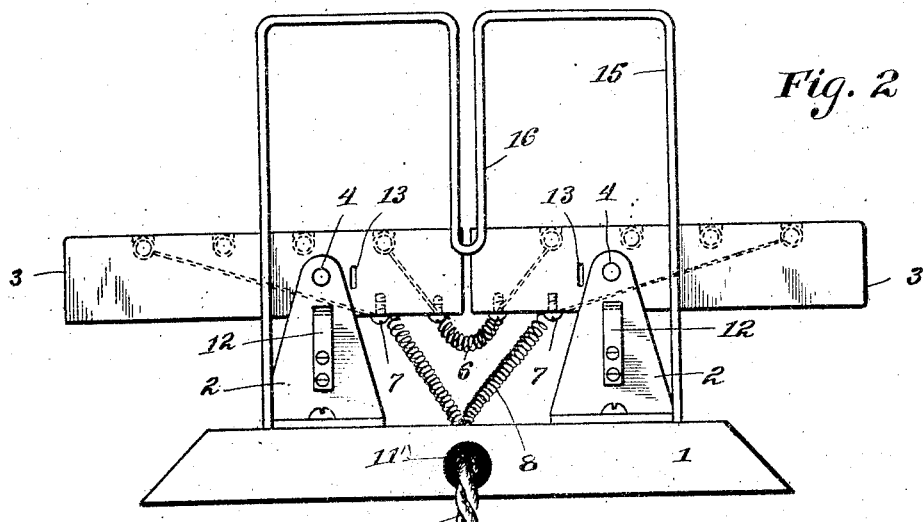
Fig. 2 is an end elevation of the same on a larger scale.
Figure 3:
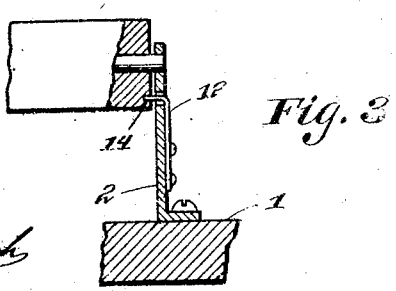
Fig. 3 is a detailed sectional view of the same.

In the embodiment of the invention here shown I provide a base 1 and I also provide two pairs of standards 2 which are arranged near the ends of the base and extend upwardly therefrom. A pair of grids 3 are arranged between the standards and pivotally mounted, each grid being provided at the ends with pivots 4 which are mounted in bearing openings near the upper ends of the standards. Hence the grids may be partly turned and may be arranged either in horizontal position, as shown in Figs. 1 and 2 for toasting bread or the like or may be turned to a vertical position and arranged in spaced relation and opposite each other, for toasting marshmallows, as shown in Fig. 4. Each grid is provided with an electric heating coil or element 5, such as are conventionally shown or of any suitable type. The heating coils are connected together by a coiled conducting wire 6 and their outer terminals 7 are connected by coiled conducting wires 8 to an electric cable or conductor 9 which passes through an opening 10 and an insulator 11 with which the base is provided at one end.

The standards are provided with spring detents 12 which may be engaged at their free ends with openings 13, 14 with which the grids are provided, the free ends of the detents being engaged with the openings 14 when the grids are in horizontal position, to hold the grids in such position, and being engaged with the openings 13 when the grids are arranged in vertical position, as will be understood.

At the ends of the standard are racks 15 which are here shown as made of wire and of substantially inverted U-shape, each rack being provided with a centrally arranged U-shaped arm 16. The said arms 16 are opposite the space between the grids when the latter are in vertical position and said arms are adapted to receive a marshmallow holder 17 to support the same with the marshmallows therein between the grids and for toasting the marshmallows. The marshmallow toaster comprises a pair of end members 18, 19 and a lower wire or bar 20 and an upper wire or bar 21. The ends of the lower wire 20 are permanently attached to the end members. One end of the wire 21 is permanently attached to the member 18. The other end of said wire 21 is free and may be engaged in a locking notch 22 with which the member 19 is provided, to lock said wire 21 and thereby hold the marshmallows, indicated at *a* in Fig. 4, between said wires 20, 21. The U-shaped or slotted arms 16 enable the marshmallow holder to be readily arranged between or removed from between the grids. In practice only a minute or two are required in which to thoroughly toast the marshmallows, the toaster acting very expeditiously.

While I have herein shown and described a preferred form of my invention, I would have it understood that changes may be made in the form, proportion and construction of the several parts without departing from the spirit of my invention and within the scope of the appended claims.

Having thus described my invention, I claim:—

1. In combination with an electric toaster comprising a pair of grids pivotally mounted and adapted to be arranged either in horizontal position in a common plane or in vertical position in spaced relation and opposite each other, a member disposed at each end of the grids and having a central vertical slot extending downwardly and a holder comprising a bar disposable within the lower ends of said slots, end members secured upon the ends of said bar, and a second bar disposed vertically above said first named bar and having one end rigidly secured to one end member and its other end detachably engaged with the other end member.

2. In combination with an electric toaster comprising a pair of grids arranged in spaced relation opposite each other; a pair of upright wire members disposed at the ends of the grids and provided centrally with downwardly extending U-shaped portions defining slots, and a holder comprising a pair of end members, a rod rigidly secured to said end members and engaging within the lower ends of said slots, and a second wire member disposed above the first named wire member and rigidly secured to one end member and detachably connected with the other end member.

In testimony whereof I affix my signature.

HUBERT J. McCLAIN.